Feb. 9, 1943.  A. J. FRANKE  2,310,580
CHUCK
Filed July 21, 1942  4 Sheets-Sheet 1

INVENTOR.
AUGUST J. FRANKE
BY
Geo. A. Senior
ATTORNEY

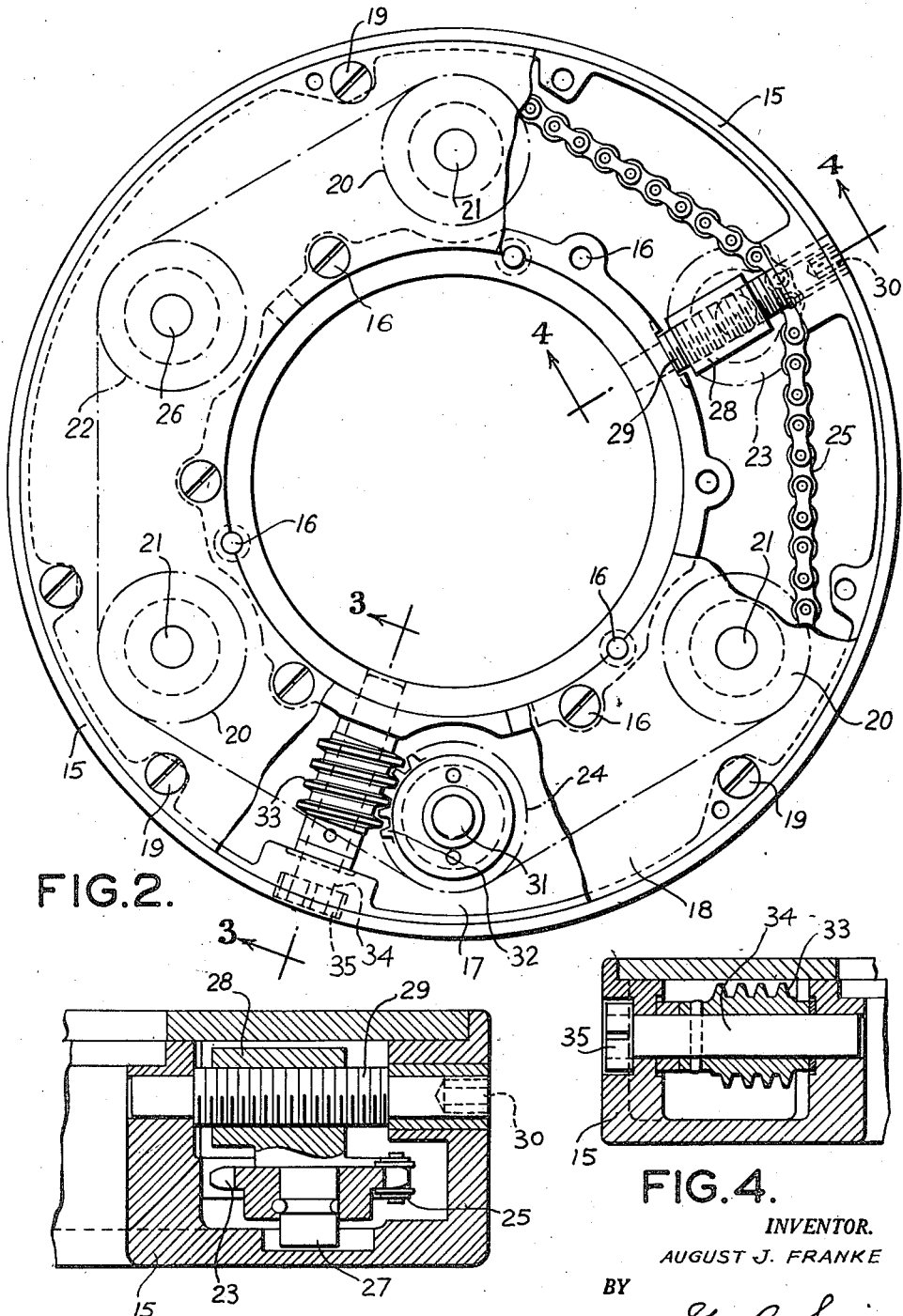

Feb. 9, 1943.  A. J. FRANKE  2,310,580
CHUCK
Filed July 21, 1942  4 Sheets-Sheet 4
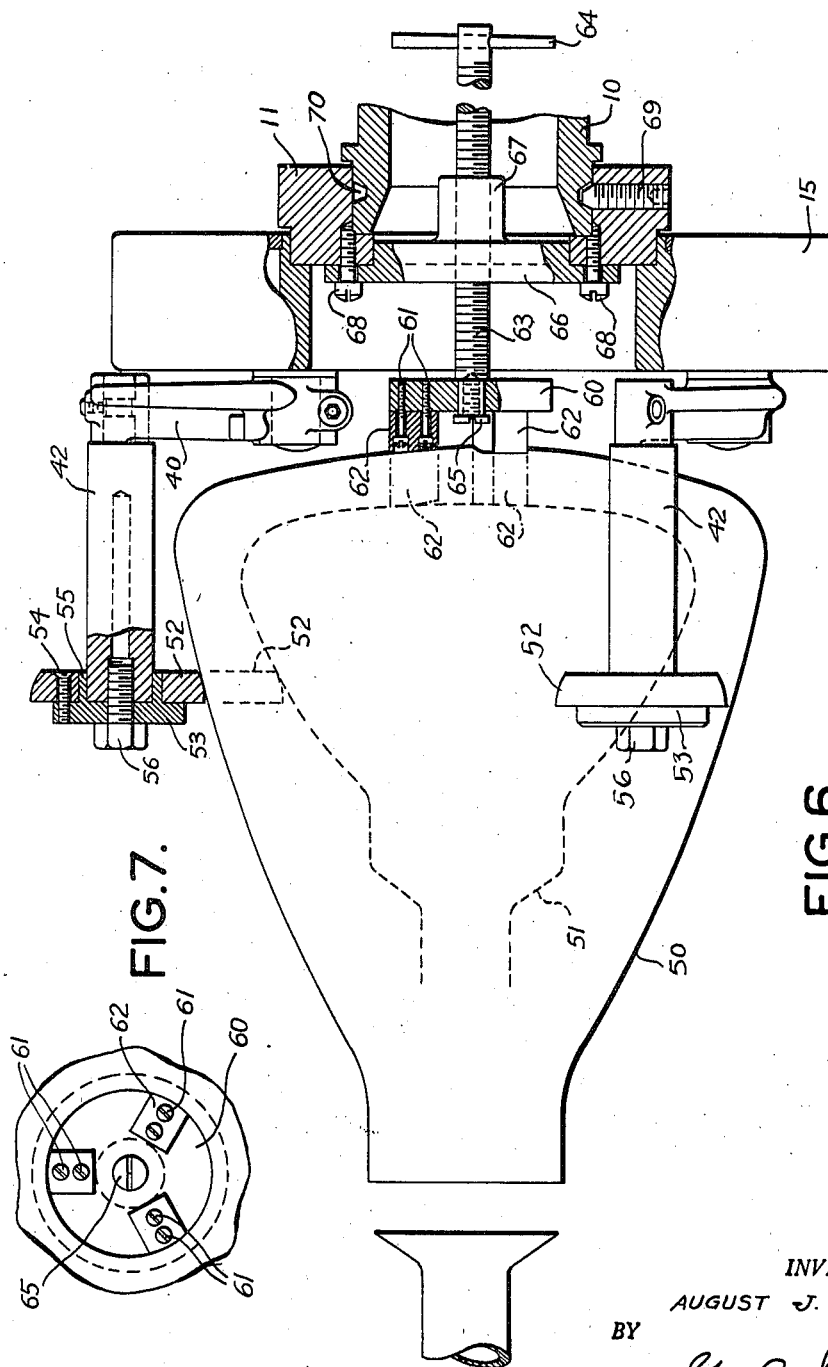

Patented Feb. 9, 1943

2,310,580

UNITED STATES PATENT OFFICE 2,310,580

CHUCK

August J. Franke, Arlington, N. J., assignor to Standard Tool and Manufacturing Co., Arlington, N. J., a corporation of New Jersey Application July 21, 1942, Serial No. 451,718

4 Claims. (Cl. 279—34)

The invention relates to chucks for holding glass or other fragile material while being operated on a lathe.

In handling glass or other fragile material with the ordinary lathe chuck a great deal of breakage occurs. This is due to the fact that the ordinary lathe chuck is built to handle and firmly grip substantial sized pieces of metal and the least extra pressure put on the chuck will crack the fragile material. One of the principal objects of the present invention is to provide a chuck which, while light and delicate in its action, will firmly grip the object to be operated on and will practically eliminate breakage.

Another object is to provide a chuck which will take care of an exceedingly wide range of diameters of articles to be operated on.

A further object is to provide a chuck which may be easily and quickly adjusted from its smallest diameter to its largest and which at all diameters is self-centering.

Still another object is to provide a chuck which by a simple operation may be thrown off center so as to take care of eccentric operations.

Another important object is to provide a chuck which will hold objects that are symmetrical but not round. The chuck of the present invention does away with a number of expensive and troublesome jigs and fixtures for holding the work.

In addition to the foregoing other advantages and objects will become apparent as this specification proceeds. Referring to the drawings forming a part thereof and in which preferred forms of the invention are illustrated:

Fig. 2 is a rear elevation, the tailstock and adapter ring being removed and parts being broken away;

Figure 5:
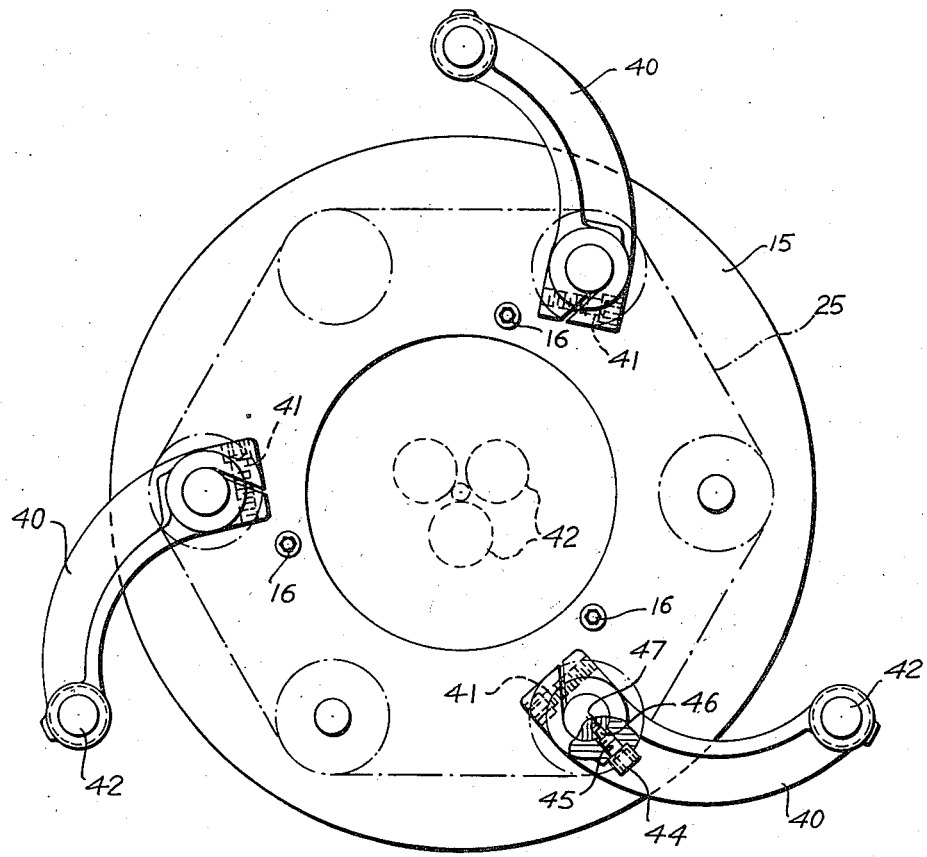

Figs. 3 and 4 are fragmentary detail sectional views taken on the lines 3—3 and 4—4 respectively of Fig. 2;

Fig. 5 is a front elevation, the work holding members in their full line position being adapted to hold a round article of considerable diameter and in their broken line position holding an article of small diameter;

Fig. 6 is a side view partly in elevation and partly in section showing the arrangement of the chuck when gripping articles that are not round; and Fig. 7 is a detail end elevation of one part of holding means used in Fig. 6.

Referring again to said drawings and particularly to Figs. 1 to 5, the reference numeral 10 designates the tailstock of a lathe to which the chuck is secured. A similar chuck would be attached to the headstock of the lathe but the lathe being no part of the present invention it is not thought necessary to illustrate this.

Figure 1:
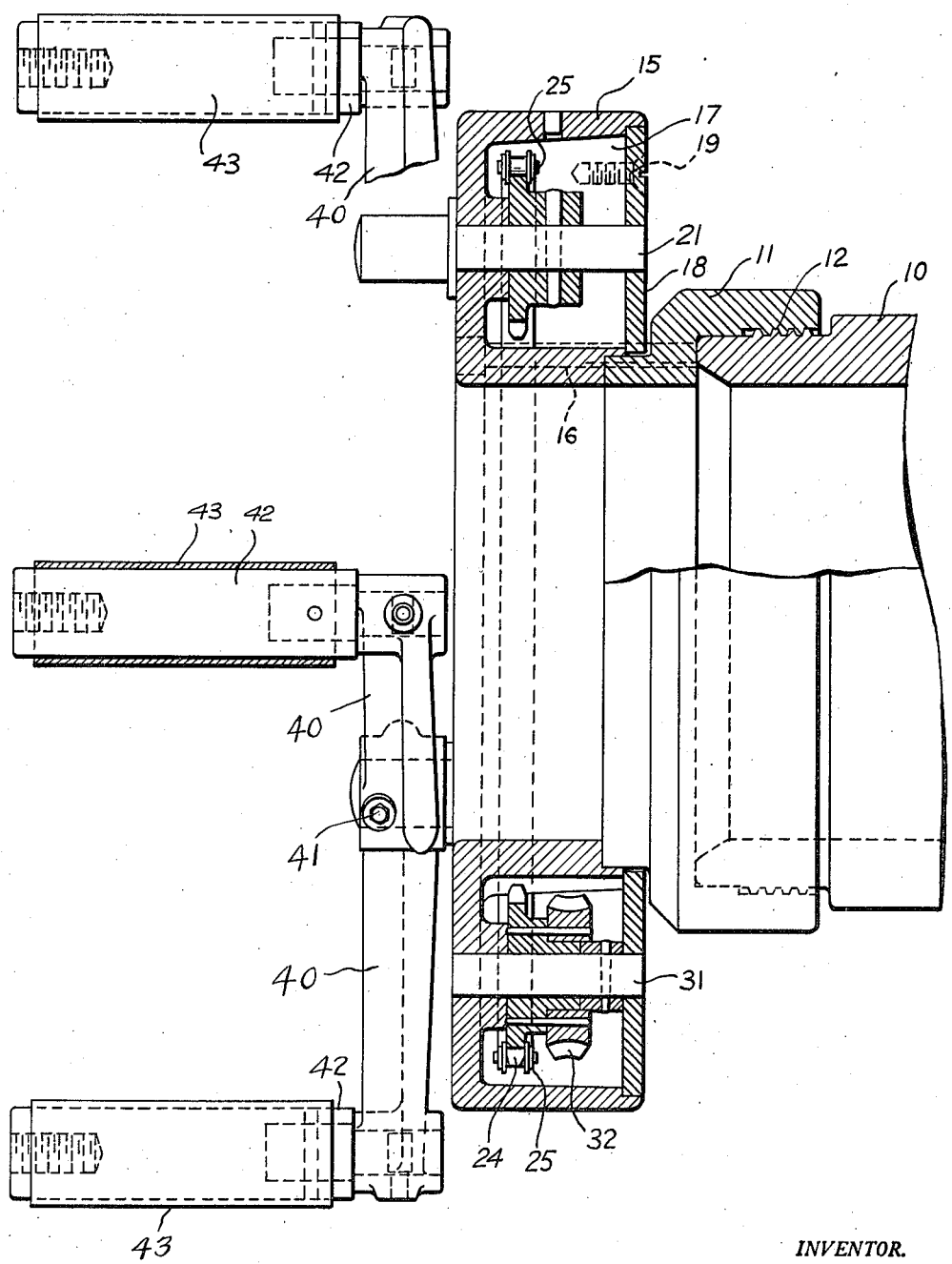
Fig. 1 is a longitudinal sectional view with parts in elevation, showing the chuck mounted on a lathe tailstock and arranged to handle round articles.

An adapter ring 11 is secured to the tailstock by threads 12 as indicated in Fig. 1. The annular body member 15 of the chuck is secured to the adapter ring 11 by screws 16. The peripheral portion of the annular body member is U-shaped in cross-section and forms a chamber 17 which is enclosed by a rear cover 18 secured to the body member by screws 19.

The chamber 17 houses the operating mechanism of the chuck. This operating mechanism comprises sprockets 20 mounted on studs 21 having bearings in the front wall of the body member and its rear cover 18. Other sprockets 22, 23 and 24 are mounted in the chamber 17. Sprocket chain 25 passes over all of said sprockets.

The sprocket 22 its mounted on a stud 26 extending between the front wall of the body member and its rear cover and is an idler sprocket. The sprocket 23 is so mounted that it may be moved away from the center of the chuck to take up slack in the sprocket chain 25 that is eventually caused by wear. Thus any lost motion in the sprockets will be eliminated and they will all have synchronous movement.

The sprocket 23 is mounted on a stud 27 which is secured to or formed as part of a threaded block 28 which is mounted for radial movement on a threaded stud 29 having suitable bearings in the body member (see Fig. 3). The stud 29 has a socket 30 in its exposed end to which a wrench or other suitable implement may be applied for rotating the stud. It is thought to be apparent that as the stud 29 is rotated the sprocket 23 will be moved away from or toward the center of the chuck.

The sprocket 24 is what might be termed the driving sprocket. This sprocket is loosely mounted on a stud 31 extending between the front of the body member and its rear cover and secured to the sprocket 24 or forming a part thereof is a worm wheel 32. The worm wheel 32 meshes with a worm 33 which is fast to a radially extending stud 34 mounted in suitable bearings in the body member. The exposed end of the stud 24 has a socket 35 to which a wrench or other suitable tool may be applied for rotating the stud. It is thought to be obvious from the foregoing that as the stud 34 is rotated the worm 33 will rotate the worm wheel 32 and through the medium of the sprocket chain 25 the sprockets 20 will be rotated synchronously.

The studs 21 which carry the sprockets 20 extend through the front wall of the body member and carry arms 40 which are secured thereto by screws 41. At their extremities the arms 40 carry forwardly extending work holders 42. As the sprockets 22 are rotated the work holders 42 will be moved toward or away from the center of the chuck to accommodate and grip work of varying diameters. The work holders may be provided with sleeves 43 of asbestos or some other slightly yielding material.

From an inspection of Fig. 5 it will be apparent that when the work holders are in their extended position as shown in full lines in this figure a tube of substantial diameter may be gripped. On large diameters the work holders may grip the tube either on the outer or inner periphery. When the work holders are brought to their retracted position as indicated by the broken lines of Fig. 5 a round article of exceedingly small diameter may be gripped. As previously stated the work holders automatically self-center the work and grip fragile articles with sufficient strength so they will be held while being rotated for the necessary operation but they will not be held tight enough to cause breakage.

It is sometimes desirable to throw the work off center in the chuck in order to perform an eccentric operation. For this purpose, as indicated in Fig. 5, one of the arms is provided with a shouldered set screw 44. The threaded portion 45 of the set screw engages a threaded opening in the hub of the arm 40 and a turned down portion 46 of the set screw engages an aperture 47 in the enlarged head of the stud 21 when the set screw is screwed home.

When it is desired to set the chuck for an eccentric operation the set screw 44 is loosened until the turned down portion 46 is withdrawn from its aperture 47. The set screw 41 is then loosened and the arm 40 may be moved in relation to stud 21. It is moved a sufficient amount to obtain the desired degree of eccentricity and the screw 41 is tightened. When the chuck is to again be adjusted for normal work this operation is reversed and the set screw 44 always insures that its arm 40 is in proper relation to the other arms.

Reference will now be had to Figs. 6 and 7 which show the adaptability of the chuck to grip articles or objects which are not round or tubular. Similar reference numerals designate similar parts and only those parts which function to hold other than round articles will be described in connection with these figures.

An odd shaped piece of work 50 is shown in full lines as being gripped by the chuck. Another odd shaped piece 51 is indicated in broken lines and the position of the gripping parts is indicated in broken lines for the smaller piece of work 51.

In this arrangement of the chuck the work holding members 42 do not directly engage the work. Instead the ends of the members 42 are provided with discs or rings 52 of a material having a small degree of resiliency.

These discs have curved edges and are secured to an annular plate 53 by screws 54. The plates 53 have skirts 55 which engage the ends of the work holders 42 and they are secured in place by bolts 56 which have threaded engagement with the work holders.

To firmly position the work in the chuck means are provided for engaging the rear portion of the work. This means comprises an annular plate 60 to which is secured by screws 61 a plurality of blocks 62 formed of a material having a slight amount of resiliency. The plate 60 is mounted on the end of a long threaded bolt 63 which passes through the tailstock. To manipulate the bolt a handle 54 is secured to its outer end. A screw 65 holds the plate 60 to the threaded bolt 63 and it will be noted a slight amount of clearance is left between the head of the screw 65 and the plate so as to allow for a slight wobble of the plate and thus permit the blocks 62 to seat better should there be any minor irregularity in the work.

The bolt 63 has threaded engagement with a plate 66 and a boss 67 thereon. The plate 66 is secured to the tailstock by screws 68. It is thought to be apparent that by rotation of the bolt 63 the plate 60 and its blocks 62 will be withdrawn or advanced to accommodate different sizes and shapes of work.

In Figs. 6 and 7 the adapter ring 11 is a slightly different shape and is secured to the tailstock by headless set screws 69 engaging an annular groove 70 in the tailstock. Obviously this construction could be used in Figs. 1 to 5 if desired.

Changes in details of construction and arrangements of parts such as would occur to one skilled in the art are to be considered as coming within the spirit of the invention as set forth in the appended claims.

I claim:

1. A chuck having in combination, an annular body portion, a plurality of arms, studs extending through said body portion in the peripheral region thereof to carry said arms, forwardly extending work holders carried by the free ends of said arms, sprockets mounted on said studs in said body portion to rotate said arms so as to move said work holders toward or away from the center of said chuck, a sprocket chain passing over said sprockets for moving same synchronously, means providing for the rotation of one of said sprockets, an idler sprocket mounted in said body portion, and means operable from the exterior of said body portion for moving said idler sprocket to take up slack in said sprocket chain.

2. A chuck having in combination, an annular body portion, a plurality of arms, studs extending through said body portion in the peripheral region thereof to carry said arms, forwardly extending work holders carried by the free ends of said arms, sprockets mounted on said studs in said body portion to rotate said arms so as to move said work holders toward or away from the center of said chuck, a sprocket chain passing over said sprockets for moving same synchronously, another sprocket mounted in said body portion and engaged by said sprocket chain, a worm wheel secured to this sprocket, a worm engaging said worm wheel, and means operable from the exterior of said body portion for rotating said worm so as to rotate all of said first mentioned sprockets synchronously.

3. A chuck having in combination, a body portion, means for securing said body portion to the headstock or tailstock of a lathe, a plurality of arms pivoted on said body portion, forwardly extending work holders carried by the free ends of said arms, sprockets mounted in said body portion for rotating said arms so as to move said work holders toward or away from the center of said chuck, a sprocket chain passing over said sprockets, means for rotating said sprockets, discs on the ends of said work holders for engaging the sides of the work, and means carried by said headstock or tailstock for engaging the rear end of the work, said means being adjustable toward or away from the work.

4. A chuck having in combination, a body portion, means for securing said body portion to the headstock or tailstock of a lathe, a plurality of arms pivoted on said body portion, forwardly extending work holders carried by the free ends of said arms, sprockets mounted in said body portion for rotating said arms so as to move said work holders toward or away from the center of said chuck, a sprocket chain passing over said sprockets, means for rotating said sprockets, discs on the ends of said work holders for engaging the sides of the work, a plurality of resilient blocks for engaging the rear end of the work, a plate on which said blocks are carried, and means for moving said plate toward and away from the work.

AUGUST J. FRANKE.